United States Patent
Bosio

[11] Patent Number: 5,386,852
[45] Date of Patent: Feb. 7, 1995

[54] FLOW-RATE LIMITING DEVICE IN A SINGLE-CONTROL MIXER CARTRIDGE FOR HOT AND COLD WATER

[75] Inventor: Orlando Bosio, Casaloldo, Italy
[73] Assignee: AMFAG S.r.l., Castelgoffredo, Italy
[21] Appl. No.: 53,279
[22] Filed: Apr. 28, 1993

[30] Foreign Application Priority Data
Apr. 30, 1992 [IT] Italy .................. MN92 A 000011

[51] Int. Cl.⁶ .............. F16K 11/078; F16K 51/00
[52] U.S. Cl. .................. 137/625.17; 137/625.4; 251/285
[58] Field of Search ........... 137/625.17, 625.4, 625.41, 137/636.3; 251/285, 288

[56] References Cited

U.S. PATENT DOCUMENTS

| | | | |
|---|---|---|---|
| 3,526,250 | 9/1970 | Miller | 137/625.4 |
| 3,680,592 | 8/1972 | Hayman | 137/625.4 |
| 3,891,005 | 6/1975 | Manoogian et al. | 251/285 X |
| 3,915,195 | 10/1975 | Manoogian et al. | 251/285 X |
| 4,043,359 | 8/1977 | Christo | 137/625.4 X |
| 4,375,225 | 3/1983 | Andersson | 251/285 |
| 4,610,272 | 9/1986 | Gottwald et al. | 251/285 X |
| 4,705,072 | 11/1987 | Egli | 251/285 X |
| 4,708,172 | 11/1987 | Riis | 251/285 X |
| 4,941,509 | 7/1990 | Orlandi | 251/285 X |
| 5,082,023 | 1/1992 | D'Alayer de Costemore D'Arc | 251/285 x |

FOREIGN PATENT DOCUMENTS

| | | |
|---|---|---|
| 0426639 | 5/1991 | European Pat. Off. |
| 2665500 | 2/1992 | France |
| 3202040 | 9/1982 | Germany |
| 2110340 | 6/1983 | United Kingdom |
| 9005868 | 5/1990 | WIPO |

*Primary Examiner*—John Rivell
*Attorney, Agent, or Firm*—Guido Modiano; Albert Josif; Daniel O'Byrne

[57] ABSTRACT

Flow-rate limiting device in a single-control mixer cartridge for hot and cold water including a body associated with a bottom for containing a fixed plate and a movable plate coupled with an actuation lever pivoted on a rotating coupling; the flow-rate limiting device includes a bush suitable to be associated with the lever and having a plurality of protrusions of different thicknesses which are adapted to selectively constitute an element for contrast against the stroke limiter of the lever which corresponds to the maximum flow-rate position.

8 Claims, 2 Drawing Sheets

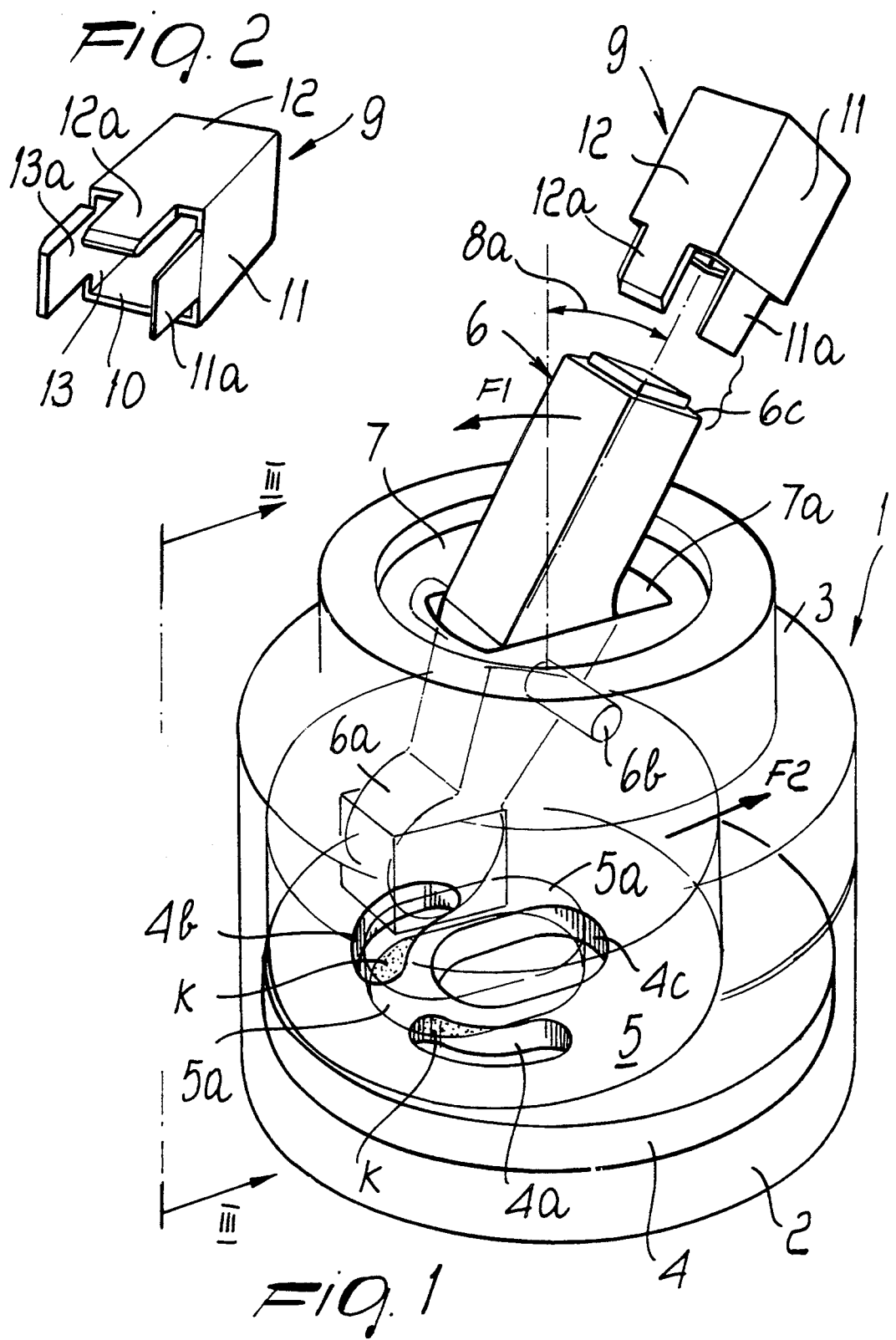

FLOW-RATE LIMITING DEVICE IN A SINGLE-CONTROL MIXER CARTRIDGE FOR HOT AND COLD WATER

BACKGROUND OF THE INVENTION

The present invention relates to a flow-rate limiting device in a single-control mixer cartridge for hot and cold water.

The widespread use of mixer cartridges is known; these cartridges are inserted in faucets and allow, by operating with a single actuation lever, both to vary the flow-rate delivered by the faucet from zero to a maximum value and to vary the temperature-of the water by appropriately mixing the hot and cold water that reach the faucet.

These devices comprise, inside a portion of space defined by a bottom with openings for the separate inflow of hot and cold water and for the outflow of hot, cold or mixed water and by a body associated with the bottom, a fixed plate made of ceramic material, which is provided with holes matching the openings of the bottom, and also comprise a movable plate, also made of ceramic material, which internally defines a mixing chamber and is associated, with a plate cover interposed or not, with said actuation lever, which is pivoted on a coupling rotatable within said body.

In this manner the movable plate can assume different positions with respect to the fixed plate, and in particular it is known that a movement of the lever about the fulcrum changes the water flow-rate, whereas rotation of the coupling varies the temperature of said water.

Due to reasons related to user requirements, it may be needed to reduce the maximum dispensed flow-rate, and for this purpose the known art provides devices usually associated with the faucet in which the cartridge is inserted; these devices have constructive complications and do not offer reliable operation.

SUMMARY OF THE INVENTION

The aim of the present invention is to provide a flow-rate limiting device which allows to obtain different values of the reduced maximum flow-rate, is easy to install and very simple.

This aim is achieved by a flow-rate limiting device in a single-control mixer cartridge for hot and cold water, according to the present invention, said cartridge comprising a body associated with a bottom for containing a fixed plate and a movable plate which is possibly provided with a plate cover coupled with an actuation lever pivoted on a rotating coupling; characterized in that it comprises a bush suitable to be associated with said lever and having a plurality of protrusions of different thicknesses which are adapted to selectively constitute an element for contrast against the stroke limiter of said lever which corresponds to the maximum flow-rate position.

BRIEF DESCRIPTION OF THE DRAWINGS

Further characteristics and advantages of the present invention will become apparent from the following description of a preferred but not exclusive embodiment thereof, illustrated only by way of non-limitative example in the accompanying drawings, wherein:

FIG. 1 is a view of the bush according to the present invention while being associated with a mixer cartridge;

FIG. 2 is a perspective view of the bush according to the invention;

DESCRIPTION OF THE PREFERRED EMBODIMENTS

Figure 3:
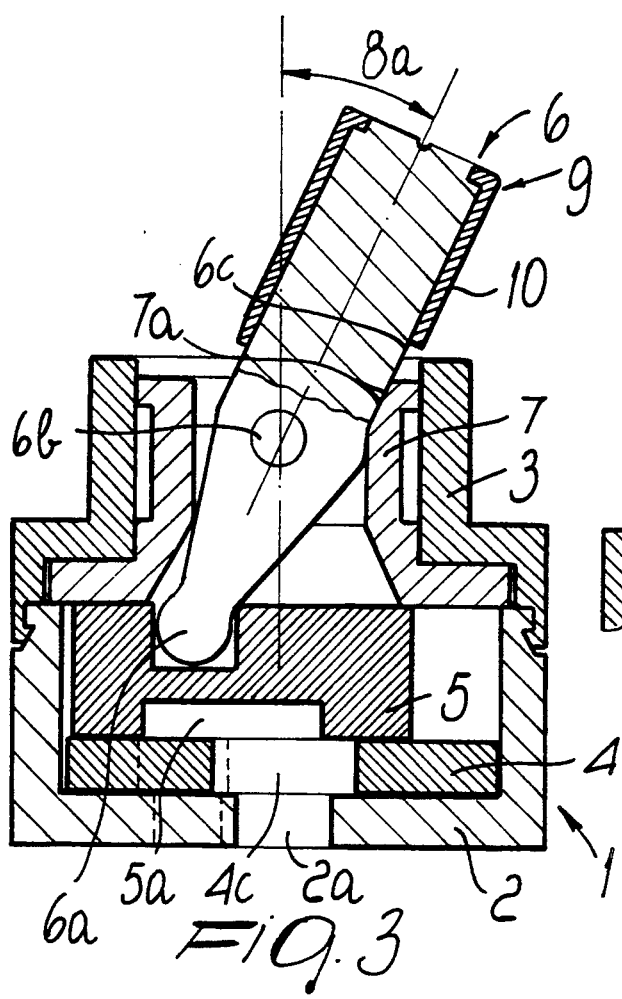
FIGS. 3 to 6 illustrate the four situations which occur at the stroke limit of the lever towards the maximum flow-rate position in the four possible conditions of association of the bush with said lever, FIG. 3 being a sectional view taken along the plane III—III of FIG. 1.

With reference to the above figures, the reference numeral 1 generally designates a mixer cartridge comprising a bottom 2 which is provided with openings for the separate inflow of hot and cold water and with an opening 2a for the outflow of hot, cold or mixed water, and which is associated with a body 3 of the cartridge.

The fixed plate 4 is superimposed on the bottom 2 and is provided with water flow openings corresponding to those provided in the bottom 2, and specifically a hot water inflow opening 4a, a cold water inflow opening 4b, and opening 4c for the outflow of hot, cold or mixed water.

A movable plate 5 is present on the fixed plate 4, internally defines the mixing chamber 5a and is suitable to assume different positions with respect to the fixed plate 4, since it is connected to the end 6a of an actuation lever 6, which is pivoted at 6b on a rotating coupling 7 comprised within the body 3.

As is known, by turning the lever 6 about the fulcrum 6b the flow-rate delivered by the cartridge varies; this circumstance is pointed out by FIG. 1, showing said lever in the position which produces the maximum flow-rate, with the wall 6c in contact with the flat wall 7a of the coupling 7, which indeed constitutes its stroke limiting abutment; the reference numeral 8a designates the angle defined by the axis of the lever with respect to the longitudinal axis of the cartridge, which in this condition is also visible in FIG. 3.

In this situation, the areas for the water flow from the inflow openings 4a, 4b in the fixed plate 4 towards the mixing chamber 5a comprised within the movable plate 5 are those shown stippled in FIG. 1 and designated by the letter k, and is it immediately apparent that these flow areas decrease, with a consequent decrease in the flow-rate, when the lever is moved in the direction of the arrow F1, with a corresponding movement of the movable plate 5 in the direction of the arrow F2.

In other words, one might say that angles smaller than 8a between the lever axis and the longitudinal axis of the cartridge are matched by flow-rate values smaller than the maximum value, which occurs at the angle 8a.

It should be noted that the situation shown in FIG. 1 relates to the middle position of the rotating coupling 7 in its rotation, and it is well-known that by turning said coupling the temperature of the delivered water is changed; however, this circumstance has been mentioned merely for the sake of completeness, since it is irrelevant for the present invention.

This introduction allows to easily understand the functionality of the device according to the present invention, which aims at limiting the maximum flow-rate deliverable by the cartridge according to a series of different values.

The device according to the invention thus comprises a bush 9, having four planar side walls suitable to make contact with the side walls of the lever 6, which has a square cross-section, when the bush is associated with said lever; as shown in FIG. 2, substantially rectangular protrusions with different thicknesses extend linearly from three of these walls, whereas the fourth wall has no protrusions.

More specifically, the reference numeral 10 designates the first wall without protrusions, 11 designates the second wall provided with the thinnest protrusion 11a, 12 designates the third wall provided with the second protrusion 12a of intermediate thickness, and 13 designates the fourth wall provided with the third wall provided with the thickest protrusion 13a.

When the bush 9 is associated with the lever 6 so that the first wall 10 with no protrusion makes contact with the flat wall 6c of said lever, the situation of FIGS. 1 and 3 occurs; in this situation, the flat wall 6c itself makes contact, by stroke limit abutment, with the stroke-limiting abutment wall 7a of the coupling 7; the angle 8a allowed to the rotation of the lever 6 is the maximum one, and thus the flow-rate delivered by the faucet is the highest.

Limitation of this maximum flow-rate is obtained by associating the bush 9 with the lever 6 in a different manner.

Figure 4:
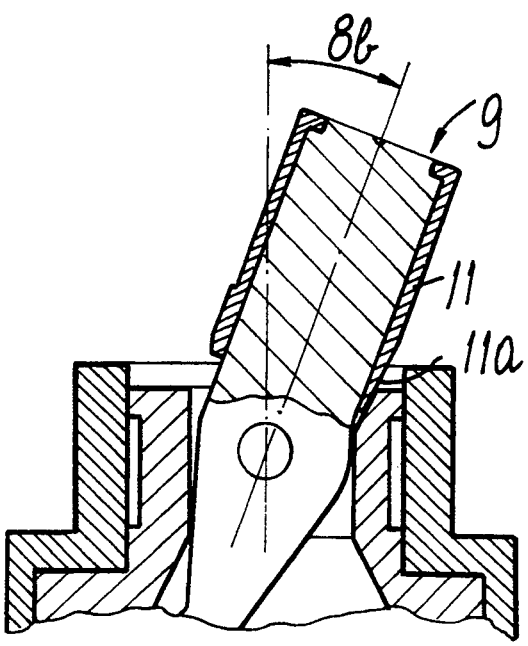

By arranging the bush so that the second wall 11 is in contact with the flat wall 6c of the lever, the situation shown in FIG. 4 occurs: the insertion of the protrusion 11a so that it forms an element for contrast against the stroke-limiting abutment wall 7a of the coupling causes the maximum stroke angle allowed to the lever 6 to be 8b, which is smaller than 8a, and the maximum flow-rate delivered by the cartridge is consequently smaller than the one produced in the condition of FIG. 3.

Figure 5:
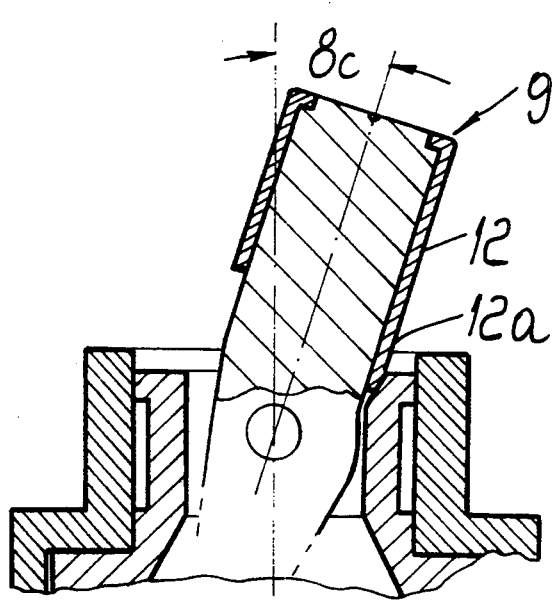
Figure 6:
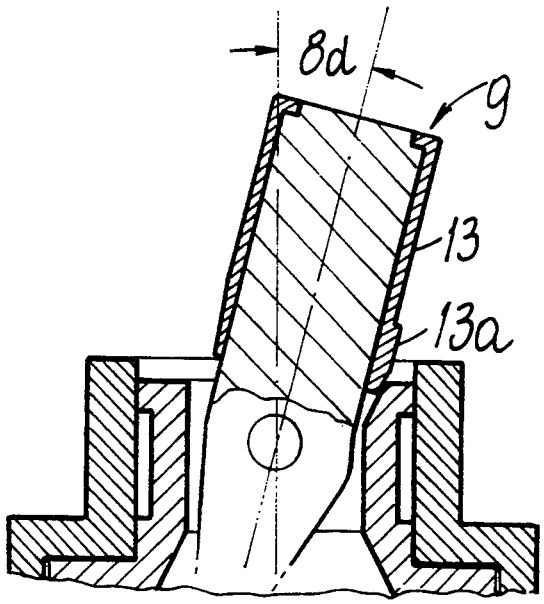

By arranging the bush 9 so that the third wall 12 is in contact with the third wall 6c, with insertion of the second protrusion 12a of intermediate thickness so that it constitutes a contrast element as shown in FIG. 5, the maximum flow-rate deliverable by the cartridge is even smaller, since the maximum stroke angle allowed to the lever is now 8c, which is smaller than 8b, and said maximum flow-rate is even smaller when the wall of the bush 9 in contact with the wall 6c is the fourth wall 13, with insertion of the thickest protrusion 13a, since in this case, shown in FIG. 6, the maximum stroke angle allowed to the lever is 8d, which is smaller than 8c.

All the above points out the excellent functionality of the device according to the present invention, which is naturally provided with means, not shown in the figures, for removable fixing in the various positions shown, combined with its great constructive simplicity.

It is obviously possible to provide more than one bush with protrusions having different thicknesses.

The described device according to the present invention is susceptible to numerous modifications and variations, all of which are within the scope of the inventive concept; thus, for example, the number of walls of the bush, with the related protrusions, may be any.

In the practical execution of the device according to the present invention, all the details may be replaced with other technically equivalent elements; the materials employed, as well as the shapes and dimensions, may furthermore be any according to the requirements.

I claim:

1. In combination, a single-control mixer cartridge for hot and cold water and a flow-rate limiting device, said single-control mixer cartridge comprising;
   a bottom;
   openings for separate inflow of hot and cold water formed in said bottom;
   an opening for outflow of hot, cold or mixed water formed in said bottom;
   a fixed plate superimposed on said bottom;
   water flow openings formed in said fixed plate opposite to said openings for separate inflow of hot and cold water and said opening for outflow of hot, cold or mixed water formed in said bottom;
   a movable plate superimposed on said fixed plate and movable to assume different positions with respect to the fixed plate;
   a mixing chamber defined internally of said movable plate;
   a body connected to said bottom, said bottom and said body together accommodating said fixed plate, said movable plate, and said plate cover;
   a coupling rotatably mounted within said body and connected to said movable plate;
   a flat stroke-limiting abutment wall defined by said coupling;
   an actuation lever connected to said movable plate and pivotally connected to said coupling, and;
   a flat wall defined by said lever facing said flat stroke-limiting abutment wall of said coupling;
   said flow-rate limiting device comprising:
   a bush connected to and selectively positionable on said lever, said bush having a first planar wall, a second planar wall, a third planar wall, and a fourth planar wall, said flat wall being engageable with said flat stroke-limiting abutment wall upon selectively positioning said first planar wall at said flat wall for allowing a maximum excursion of said lever with respect to said coupling;
   a first protrusion protruding linearly from said second planar wall and being selectively positionable at said flat wall for abutment engagement with said flat stroke-limiting abutment wall for reducing excursion of said lever with respect to said coupling;
   a second protrusion protruding linearly from said third planar wall and having a thickness greater than said first protrusion, said second protrusion being selectively positionable at said flat wall for abutment engagement with said flat stroke-limiting abutment wall for further reducing excursion of said lever with respect to said coupling, and;
   a third protrusion protruding linearly from said fourth planar wall and having a thickness greater than said second protrusion, said third protrusion being selectively positionable at said flat wall for abutment engagement with said flat stroke-limiting abutment wall for even further reducing excursion of said lever with respect to said coupling.

2. Combination according to claim 1, wherein said first protrusion extends parallel to said second protrusion, and wherein said third protrusion extends parallel to said first protrusion and said second protrusion.

3. Combination according to claim 1, wherein said first protrusion, said second protrusion and said third protrusion each have a substantially rectangular configuration.

4. Combination according to claim 1, wherein said first protrusion is located opposite said third protrusion and wherein said second protrusion is perpendicular to said first protrusion and said third protrusion.

5. A flow-rate limiting device for single-control mixer cartridges of the type including a coupling rotatably mounted within a body and connected to a movable plate, a flat stroke-limiting abutment wall defined by said coupling, an actuation lever connected to said movable plate and pivotally connected to said coupling, and a flat wall defined by said lever facing said flat stroke-limiting abutment wall of said coupling said flow-rate limiting device comprising:

- a bush connected to and selectively positionable on said lever;
- a first planar wall defined by said bush and being selectively positionable at said flat wall, said flat wall being engageable with said flat stroke-limiting abutment wall upon selectively positioning said first planar wall at said flat wall for allowing a maximum excursion of said lever with respect to said coupling;
- a second planar wall defined by said bush adjacent to said first planar wall;
- a first protrusion extending linearly from said second planar wall and defining a first protrusion thickness, said first protrusion being selectively positionable at said flat wall and engageable with said flat stroke-limiting abutment wall, in abutment engagement therewith, whereby to reduce the excursion of said lever with respect to said coupling;
- a third planar wall defined by said bush adjacent said planar second wall;
- a second protrusion extending linearly from said third planar wall and defining a second protrusion thickness, said second protrusion thickness being greater than said first protrusion thickness, said second protrusion being selectively positionable at said flat wall and engageable with said flat stroke-limiting abutment wall, in abutment engagement therewith, for further reducing excursion of said lever with respect to said coupling;
- a fourth planar wall defined by said coupling adjacent said third planar wall, and;
- a third protrusion extending linearly from said fourth planar wall and defining a third protrusion thickness, said third protrusion thickness being greater than said second protrusion thickness, said third protrusion being selectively positionable at said flat wall and engageable with said flat stroke-limiting abutment wall, in abutment engagement therewith, for even further reducing excursion of said lever with respect to said coupling.

6. Flow-rate limiting device according to claim 5, wherein said first protrusion extends parallel to said second protrusion, and wherein said third protrusion extends parallel to said first protrusion and said second protrusion.

7. Flow-rate limiting device according to claim 5, wherein said first protrusion, said second protrusion and said third protrusion each have a substantially rectangular configuration.

8. Flow-rate limiting device according to claim 1, wherein said first protrusion is located opposite said third protrusion and wherein said second protrusion is perpendicular to said first protrusion and said third protrusion.

* * * * *